Feb. 6, 1968      J. W. BERNARD      3,366,981
FROZEN FOOD CLEAVER
Filed Dec. 31, 1964
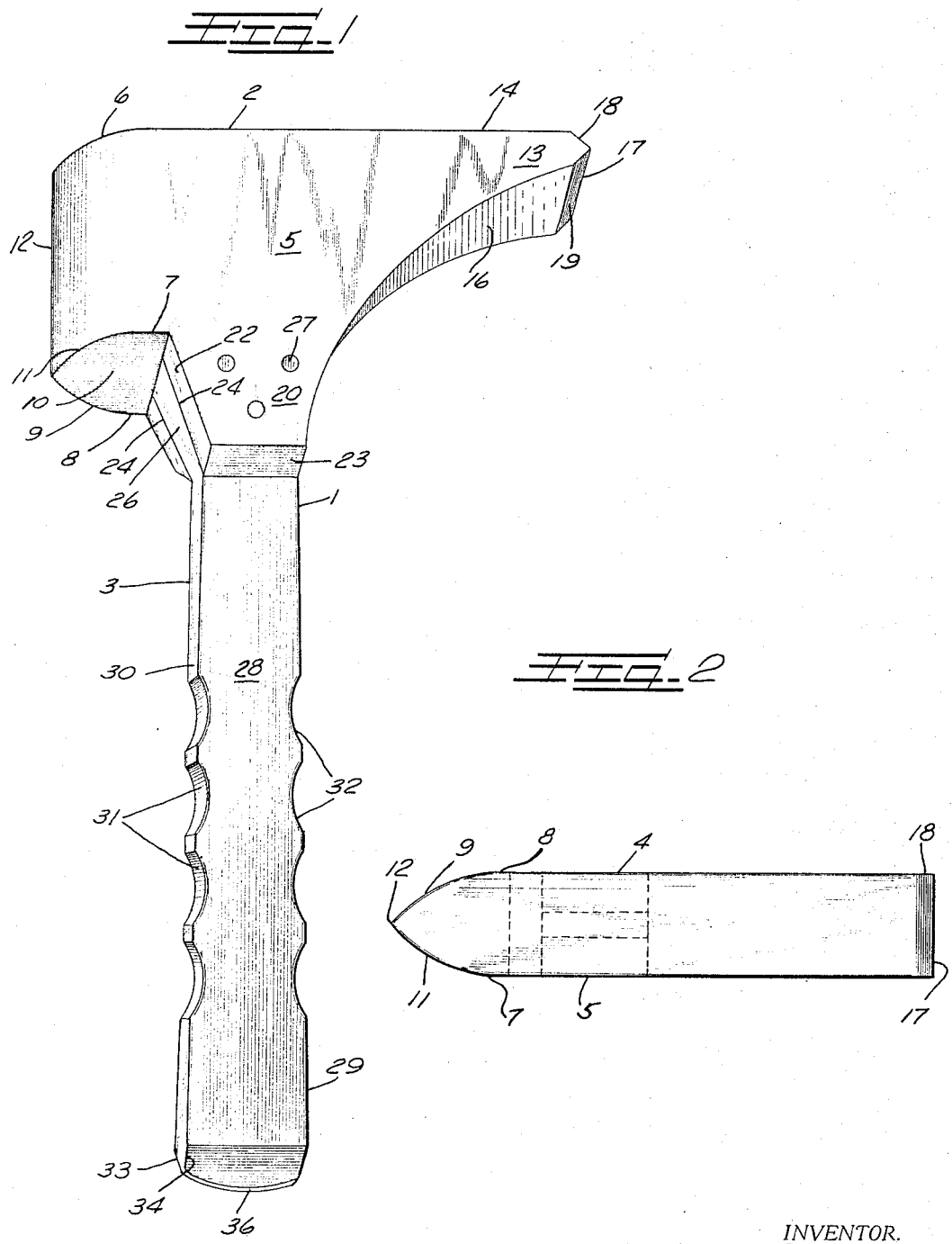
INVENTOR.
JOHN W. BERNARD
BY Hill, Sherman, Meroni, Gross & Simpson    ATTORNEYS

United States Patent Office 3,366,981
Patented Feb. 6, 1968

3,366,981
FROZEN FOOD CLEAVER
John W. Bernard, Spring Valley, Minn. 55975
Filed Dec. 31, 1964, Ser. No. 422,679
2 Claims. (Cl. 7—1)

This invention relates to a kitchen tool employing blunt action edges and broad rounded surfaces for the purpose of effectively cleaving foods bound together through freezing and particularly for separating frozen meats.

Quick-freezing has continued to revolutionize the preparation of foods. However, while the freezing art has advanced steadily, there has developed a noticeable need for advanced methods of manipulating frozen foods. This invention is directed to that need.

It is common knowledge that frozen foods require special handling and packaging. For instance, to meet health requirements and to avoid deterioration over extensive periods of storage the packaging of frozen foods must be of a high quality and consistency. But high quality means a concomitant high cost.

Cost-wise, therefore, it becomes apparent that many foods such as pre-cut meats are frozen collectively rather than individually.

The result of collective freezing however, tends to be equally as frustrating as the high cost of packaging and has encouraged many householders to ultimately choose the latter. The unsatisfactory effect experienced, derives from the fact that cut meats have excessive moisture which readily binds individual servings into a solid block upon freezing and which prevents their separation but for the time consuming and often laborious process of thawing. Neither is the binding of individual servings into a single mass retarded by utilizing tissue between the layers; the sheets simply become amalgamated into the whole, complicating the original problem.

Heretofore, attempts at separating individual parcels while yet in a frozen condition have meant improperly employing a carving knife (usually point first) or some other unspecialized tool generally resulting in an unhappy failure for both the blade and the user. In addition, the parcels themselves often become broken, cut, or otherwise destroyed.

Therefore, it is a principal object of this invention to provide a tool that can be safely and efficiently used as a household culinary utensil.

It is also an object of this invention to provide a kitchen tool for effectively separating foods bound together through the freezing process.

It is a further object of this invention to provide a kitchen tool having blunt edges and curved faces whereby foods bound through freezing can be effectively separated.

Additional features, objects and advantages of this invention will be understood from the following description and the associated drawings in which an exemplification of the invention is shown.

On the drawings:

FIGURE 1 is an isometric view of the kitchen tool according to the specification of this invention.

FIGURE 2 is a top view of the tool as shown in FIGURE 1.

As shown on the drawings:

Reference numeral 1 designates generally a kitchen tool having a utensil head 2 and a grip handle 3 affixed by a suitable means.

The utensil head 2 is constructed of a corrosive resistant metal such as stainless steel or the like and is designed to have a substantial weight for increasing the ability of the user to deliver a relatively effortless blow to the foods to be separated.

The head 2 has principal plane faces 4 and 5 extending forward for forming a wedge-like projection 6. The projection 6 has parallel faces 7 and 8 extending to outwardly curved surfaces 9 and 11 and defining a base wall 10 thereby.

The surfaces 9 and 11 are tapered to have the convex profile shown in FIGURE 2 terminating in a blunt primary action edge 12.

The faces 4 and 5 also extend in a rearward direction to define a pick-like projection 13. The projection 13 comprises generally an upper plane surface 14 and a lower inwardly curved surface 16.

As opposed to the abrupt form of the projection 6 created by the convex surfaces 9 and 11, the inwardly curved surface 16 coupled with the plane surface 14 tends to render the projection 13 elongated in character and thereby suitable to a claw-like task.

The projection 13 has a chamfered edge 17 defined by the flat surfaces 18 and 19. The chamfering of the projection 13 gives the edge 17 a blunt form similar to that characterizing edge 12.

The parallel faces 4 and 5 have a truncated support 20 comprising a side wall 21 which is a continuation of the inwardly curved face 16 and a side wall 22 extending from the base 10 of the wedge-like projection 6 to the truncated face 23.

The support 20 has a slot 24 for receiving a flared section 26 of the handle 3. The section 26 is then riveted to the support 20 as at 27.

The grip handle 3 is constructed of uniform thickness material preferably also stainless steel. The handle 3 has plane faces 28 slightly tapered from the truncated face 23 to the extremity 29. Edges 30 of the handle 3 have scalloped surfaces 31 developing grooves 32 providing the user with an improved means of gripping the utensil. The need for an improved grip is apparent when the wet nature of frozen goods is considered.

The handle 3 has an additional taper at the extremity 29 as shown by the chamfered edges 33 and 34. The chamfered edges 33 and 34 terminate in a blunt ridge 36 for providing an additional functional surface.

In operation the utensil is initially employed in a hammer-like fashion directing the primary edge 12 at the seam of the frozen parcel to be divided. Usually utilization of the tool in this capacity will be adequate to accomplish the result sought. The combination of the blunt edge 12 and the convex surfaces 9 and 11 provide the shock necessary to separate the parcel. It should be noted that the parcels are shocked apart rather than cut or sawed allowing them to retain their natural appeal.

If, however, areas that cannot be reached by the idealized abrupt projection 6 remain bound, the secondary action edge 17 in conjunction with the pick-like projection 13 can be invoked. The long inwardly curved face 16 is designed to permit penetration of the edge 17 while providing adequate leverage as well as a variable fulcrum for prying the parcels at different depths.

Finally the tapered faces defined by edges 33 and 34 at the handle extremity 29 can be utilized for difficult to reach areas. Here also the edge 36 is blunt in nature providing as in the cases of edges 12 and 17 for non-destructive separation of the frozen foods.

If desired the handle and head may be formed as a single forging or casting eliminating the rivets or other securing means.

It will be understood that various modifications may be suggested by the embodiment disclosed but I desire to claim within the scope of the patent warranted hereon all such modifications as come within the scope of my invention.

I claim as my invention:

1. A kitchen tool comprising:
a percussion head and a grip handle affixed thereto, said percussion head having a forward and a rearward section formed integrally therewith, said forward section having a first wedge-like projection and a primary action edge disposed longitudinally thereon, said first wedge-like projection being defined by outwardly curved tapered surfaces and terminating in said primary action edge, said rearward section having a second wedge-like projection and a secondary action edge disposed perpendicular to said primary action edge, said second wedge-like projection being defined by a plane surface and an inwardly curved surface and terminating in said secondary action edge, whereby said primary action edge and said secondary action edge are combined to be readily employable as a single household utensil.

2. A kitchen tool comprising:

a percussion head and a grip handle affixed thereto, said percussion head having a weighty body and a forward and rearward section thereof, said forward and rearward section being formed integrally with said weighty body, said forward section having a relatively abrupt wedge-like projection and a primary action edge disposed longitudinally thereon, said relatively abrupt wedge-like projection being defined by outwardly curved tapered surfaces and terminating in said primary action edge, said rearward section comprising a relatively elongated wedge-like projection having a secondary action edge disposed perpendicular to said primary action edge, said relatively elongated wedge-like projection being defined by a plane surface and an inwardly curved surface and terminating in said secondary action edge, whereby said primary action edge and said secondary action edge are cooperably employable for separating frozen culinary items.

References Cited

UNITED STATES PATENTS

| | | | |
|---|---|---|---|
| 514,308 | 2/1894 | Davis | 145—29 |
| 3,219,316 | 11/1965 | Fried | 254—131 |
| 838,405 | 12/1906 | Henkel | 145—2 X |
| 1,280,465 | 10/1918 | Herron | 145—2 |
| 2,860,858 | 11/1958 | Kurs | 7—1 |

FOREIGN PATENTS

| | | |
|---|---|---|
| 731,969 | 6/1955 | Great Britain. |
| 1,282,706 | 12/1961 | France. |

OTHELL M. SIMPSON, *Primary Examiner.*

WILLIAM FELDMAN, *Examiner.*

R. V. PARKER, JR., *Assistant Examiner.*